United States Patent [19]

Shinbo et al.

[11] Patent Number: 5,027,222

[45] Date of Patent: Jun. 25, 1991

[54] APPARATUS FOR RECORDING AUDIO SIGNALS AND VIDEO SIGNALS ON A RECORDING MEDIUM

[75] Inventors: Masatoshi Shinbo, Minoo; Hideki Fujie, Hirakata; Kaoru Iwakuni, Yawata; Akira Muto, Sakai; Kazuhiro Aoki, Moriguchi, all of Japan

[73] Assignee: Matsushita Electric Industrial Co., Ltd., Osaka, Japan

[21] Appl. No.: 367,713

[22] Filed: Jun. 19, 1989

[30] Foreign Application Priority Data

Jun. 17, 1988 [JP] Japan .............................. 63-150720

[51] Int. Cl.$^5$ .............................................. H04N 9/81
[52] U.S. Cl. .................................... 358/330; 358/342; 358/343; 360/19.1; 360/23; 360/24
[58] Field of Search ................. 358/310, 328, 329, 12, 358/14, 15, 335, 341, 342, 315, 316, 318, 319, 320, 330, 343; 360/18, 20, 24, 29, 30, 33.1, 23, 19.1

[56] References Cited

U.S. PATENT DOCUMENTS

| | | | |
|---|---|---|---|
| 4,138,694 | 2/1979 | Doi et al. ......................... | 360/32 X |
| 4,618,894 | 10/1986 | Ichinoi ................................ | 358/310 |
| 4,661,863 | 4/1987 | Ichinoi ............................. | 358/343 X |
| 4,691,248 | 9/1987 | Nishimoto ............................ | 358/320 |
| 4,812,924 | 3/1989 | Fukami et al. ......................... | 360/32 |
| 4,823,207 | 4/1989 | Kobayashi et al. .................... | 360/32 |

OTHER PUBLICATIONS

"Video Synchronizing Signal Standards and Their Trend (No. 6)", Hoso Gijutsu (Broadcasting Technologies), pp. 92–97, Apr., 1986.

*Primary Examiner*—Aristotelis M. Psitos
*Assistant Examiner*—W. R. Young
*Attorney, Agent, or Firm*—Wenderoth, Lind & Ponack

[57] ABSTRACT

In an audio and video recording apparatus, a video signal is separated into a luminance signal and a chrominance signal. The luminance signal is separated into low frequency and high frequency components. The high frequency component signal is subjected to balanced modulation to be thereafter band-compressed by interleaving the lower side band thereof to the low frequency component. The chrominance signal is processed to be a line sequential color difference signal. An audio signal is sampled and encoded. The luminance signal, the color difference signal and the audio signal are subjected to time-axis compression multiplexing in one frame with a synchronizing signal, address signals and control signals. The multiplex signal is recorded on a recording medium.

9 Claims, 5 Drawing Sheets

APPARATUS FOR RECORDING AUDIO SIGNALS AND VIDEO SIGNALS ON A RECORDING MEDIUM

BACKGROUND OF THE INVENTION

1. Field of the Invention

This invention relates to an audio and video recording apparatus using a recording medium such as an optical disk, magnetic disk, magnetic tape or the like and particularly using a re-writable recording medium.

2. Prior Art

Conventional apparatuses for recording audio and video signals on a recording medium use either a magnetic tape or an optical disk as the recording medium. A typical one of those apparatuses using the magnetic tape is a consumer video tape recorder. The consumer video tape recorder first separates a video signal into a luminance signal and a chrominance signal. Then, the luminance signal thus separated is frequencymodulated so that the sync tip is 5.4 MHz and the white peak is 7 MHz. On the other hand, the chrominance signal is subjected to the low band frequency conversion so that a sub-carrier of 3.58 MHz becomes 629 kHz, and amplitudemodulated to become an AM wave having a frequency band of about 1 MHz. In the gap between the FM luminance signal and the AM chrominance signal, an FM audio signal obtained through frequency-modulation of two channel audio signals is inserted to perform a frequency-division multiplex recording.

In addition, a typical example of those apparatuses using the optical disk is the so-called laser disk used only for reproduction which makes the best use of fast accessibility of the optical disk. With the reproduction-only optical disk, the video signal of NTSC is directly frequencymodulated, and the two-channel audio signal is frequencymodulated and frequency-division multiplexed in the low frequency area or the same signal as the audio signal of a compact disk is frequency-division multiplexed in the low frequency area.

Also, as a system proposed first from Britain's IBA for broadcasting via satellite, the Multiplexed Analogue Component (MAC) system is known. See "Video Synchronizing Signal standards and their Trend (No. 6)", Hoso Gijutsu (Broadcasting Technologies), pp. 92–97, April, 1986. As the MAC system, such systems as A-MAC, B-MAC, C-MAC, D-MAC and D2-MAC are known. A common point of these systems is the inline time-division multiplex in which the luminance signal is transmitted every line and two chrominance difference signals are transmitted alternately every line. In addition, the audio signal is a digital signal and subjected to the in-line time-division multiplex with the video signal.

With the consumer video tape recorders and the reproduction-only optical disk players, the video signal and audio signal are subjected to frequency-division multiplex recording, so that either the after-recording or the independent editing of the audio or video signal is impossible.

Also, the consumer video tape recorders using two or more carriers will generate cross modulation. On the other hand, the optical disk players will generate cross color or cross luminance interference.

The MAC system is a system proposed contingent upon broadcasting via satellite originally and the video and audio signals are subjected to the time-division multiplex in each line. Therefore, such problems occur that the time axis compression ratio of each signal becomes high and that when the recording and erasing of the audio or video signal is to be carried out repeatedly, the control becomes difficult due to the eccentricity of the optical disk or uneven rotation of the turn-table.

SUMMARY OF THE INVENTION

An object of this invention is to provide an audio and video recording apparatus which makes possible the afterrecording of an audio signal or the independent recording and erasing of an audio signal or video signal using a re-writable recording medium.

In order to attain the above-mentioned object, an audio and video recording apparatus of this invention comprises means for band-compressing a luminance signal of an input video signal to obtain a band-compressed luminance signal, means for executing a color difference line sequential process on a chrominance signal of the input video signal to obtain a color difference line sequential signal, first multiplexing means for executing a time axis compression multiplex on each of the band-compressed luminance signal and the color difference line sequential signal in every frame, frequency-modulation means for frequency-modulating an output signal from the first multiplexing means, digital audio signal conversion means for converting an analog input audio signal into a digital audio signal, time-axis compression means for time-axis compressing an output signal from the digital audio signal conversion means in every frame, digital modulation means for digitally modulating an output signal from the time-axis compression means, digital data generation means for generating digital data, synchronizing signal generation means for generating a specific synchronizing signal from an input video signal, second multiplexing means for multiplexing output signals from the frequency modulation means, digital modulation means, digital data generation means and synchronizing signal generation means, and recording means for recording an output signal from the second multiplexing means on a recording medium.

With the construction mentioned above, an audio signal and video signal are subjected to a time-division multiplex recording after the time-axis compression in every frame, which makes it possible to execute either the afterrecording of an audio signal or the independent recording and erasing of audio or video signal. In addition, through the time-division multiplex recording by separating the video signal into a luminance signal and a chrominance signal, interferences such as cross-color and crossluminance can be eliminated. Also, by band-compressing the luminance signal of a video signal by frequency interleaving, the recording frequency can be held low. Further, using a synchronizing signal period and a synchronizing signal pulse width which are different from those of the synchronizing signal of an input video signal, the synchronizing signal pulse width is particularly narrowed to widen the recording area of the video and audio signals, so that the recording frequency of each signal can be held low. Also, by optimizing the recording area ratio of a luminance signal, color difference signal and audio signal, the highest recording frequency of each signal can be maintained almost the same. Even when the sampling of an audio signal is to be executed using a frequency not in a simple integer ratio relationship with the frame frequency of a video signal, by changing the number of samples to be processed in every frame, a digitized, an audio signal can be recorded while maintaining the digitized audio signal at a high quality. Also, audio signals separately recorded by a digital audio tape (DAT) recorder or the like are possible to be recorded in synchronizing with video signals. In addition, a mode discrimination code showing the sampling frequency, the number of quantization bits and the number of channels of an audio signal for discriminating the quality of the audio, signal can be recorded.

Still furthermore, an absolute address signal indicating the the track number or the frame number, a relative address signal indicating the time code having the frame accompanied with an input video signal as the minimum unit, and digital data independent of the audio and video signals can be recorded. Also, an audio and video recording apparatus of this invention is able to respond to a wide variety of applications that only audio signals are to be recorded in all areas or data are to be recorded in all areas.

Further, the recording apparatus of this invention can record the absolute address of a frame unit on recording medium, so that a fast accessing becomes possible.

BRIEF DESCRIPTION OF THE DRAWINGS

FIGS. 5(a)-4(d) show frequency allocations of a video signal in a recording apparatus of this invention.

DESCRIPTION OF THE PREFERRED EMBODIMENTS

Figure 1:
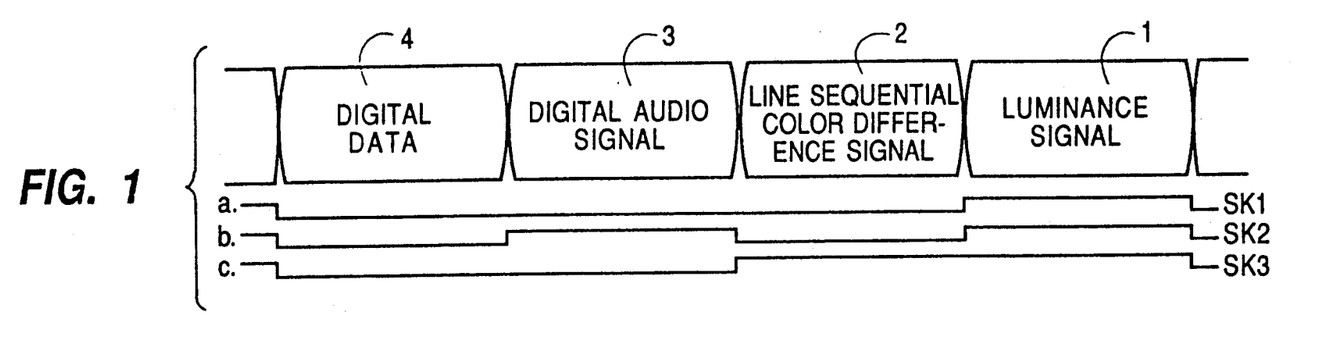
FIG. 1 shows an in-frame time-division multiplex signal format of audio and video signals of this invention.

FIG. 1 is a format diagram showing a luminance signal 1 of one frame, a line sequential color difference signal 2 of one frame, a digital audio signal 3 of one frame and a digital data 4 which is related to or independent of the luminance signal 1, line sequential color difference signal 2 and digital audio signal 3. These are subjected to a time axis compression multiplex.

Figure 2:
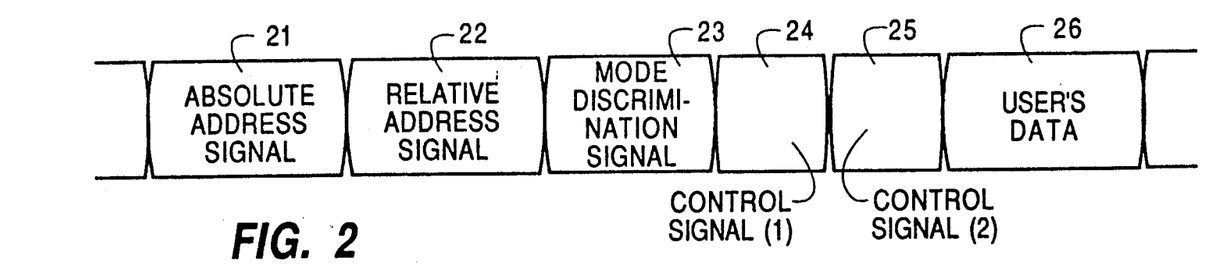
FIG. 2 is a detailed signal format diagram showing the digital data 4 shown in FIG. 1.

FIG. 2 is a detailed signal structural diagram showing the digital data 4 shown in FIG. 1.

In FIG. 1, the digital data 4 is positioned at the beginning of a frame and consists, as shown in FIG. 2, of an absolute address signal 21 showing either the track number or the frame number peculiar to a recording medium, a relative address signal 22 showing the time code having the frame accompanied with an input video signal as the minimum unit, a mode discrimination signal 23 showing the sampling frequency, the number of quantization bits and the number of channels of the audio signal, a first control code 24 showing the number of effective samples of the digital audio signal in one frame, a second control code 25 showing the repetition of the first control code, and independent data 26 that users can use freely.

The absolute address signal 21 on a recording medium includes, for example, the track number formed in a spiral form on an optical disk or those equivalent thereto each having continuous values from the inner or outer periphery of an optical disk. The relative address signal 22 includes a time code accompanied with an input video signal such as the time code of SMPTE which is well-known.

The digital audio signal 3 is a digital audio signal of 2 or 4 channels for one frame. The digital audio signal 3 is a signal such that, for example, if the sampling frequency of an audio signal is not in a simple integer ratio relationship to the frame frequency as in case of a NTSC signal with a sampling frequency of 48 kHz, the number of effective samples to be processed in each frame is varied so as not to generate an excess and deficiency in the number of samples on a long-time average basis. If the sampling frequency thereof is in a simple integer ratio relationship to the frame frequency, for example, in case of a PAL signal, the number of effective samples in each frame is the same.

Figure 3:
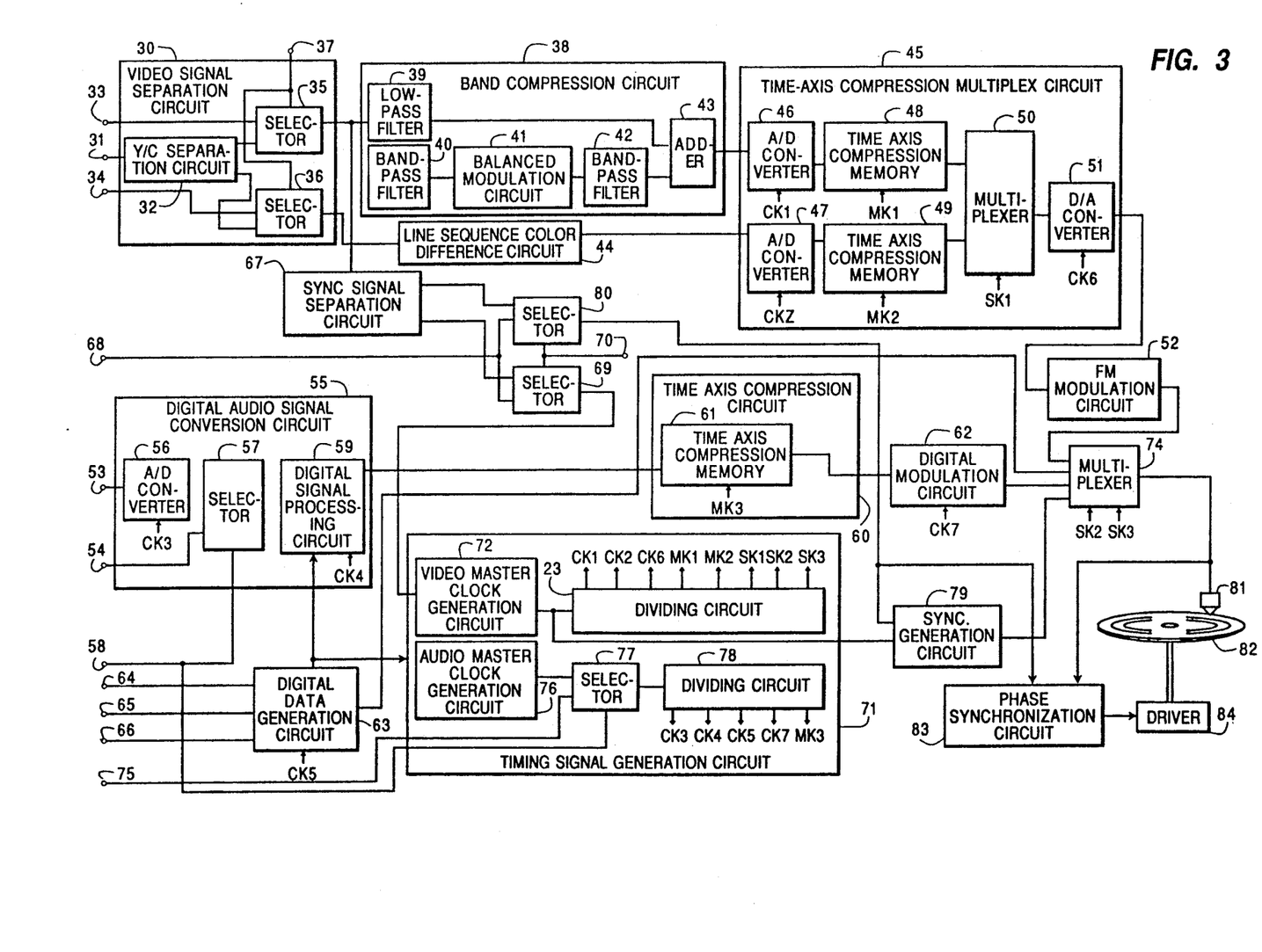
FIG. 3 is a block diagram showing a signal processing circuit of a recording apparatus of this invention.
Figure 4A:
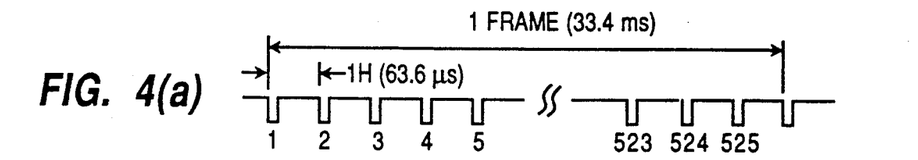
FIGS. 4(a)-4(f) show synchronizing signals used in a recording apparatus of this invention.
Figure 4B:
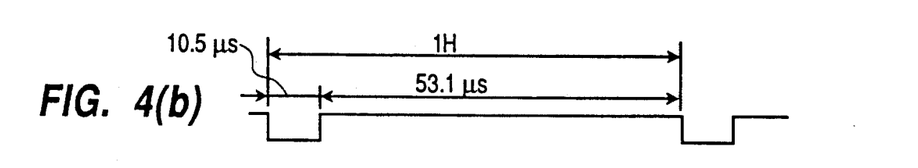
Figure 4C:
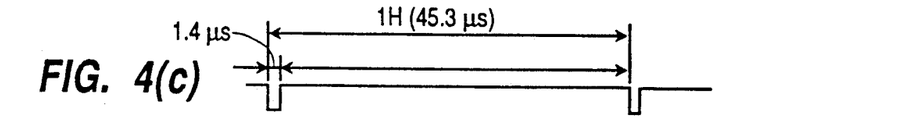
Figure 4D:
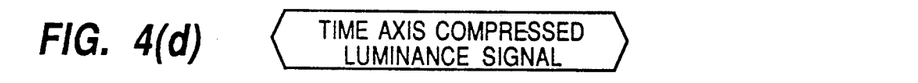
Figure 4E:
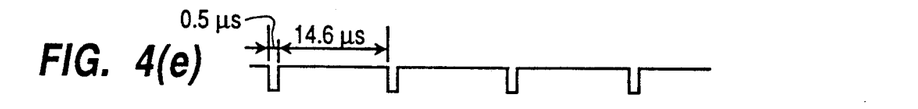
Figure 4F:
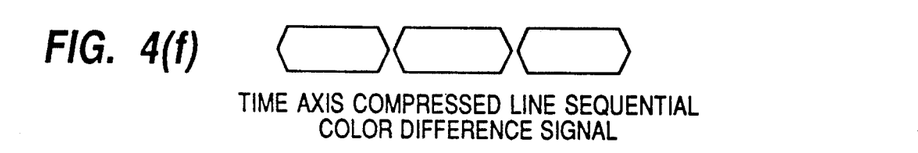
Figure 5A:
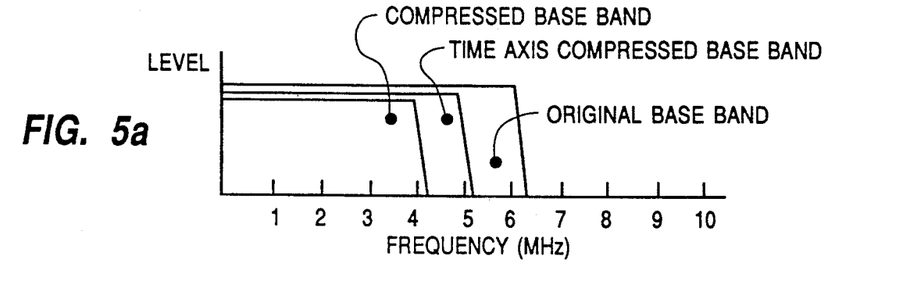
Figure 5B:
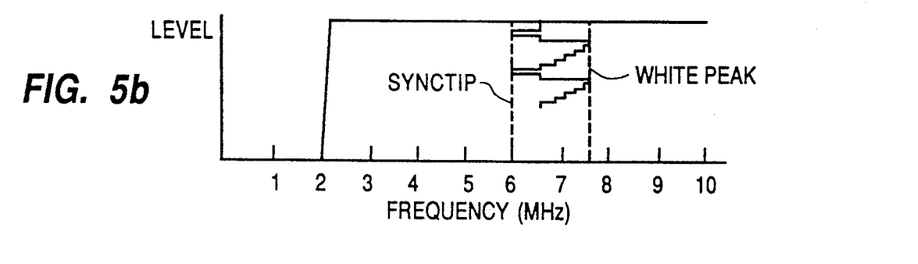
Figure 5C:
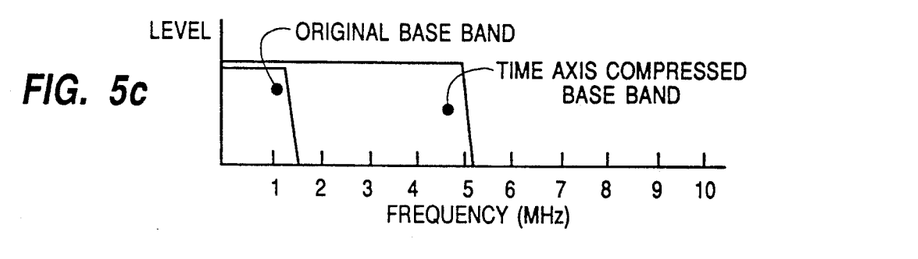
Figure 5D:
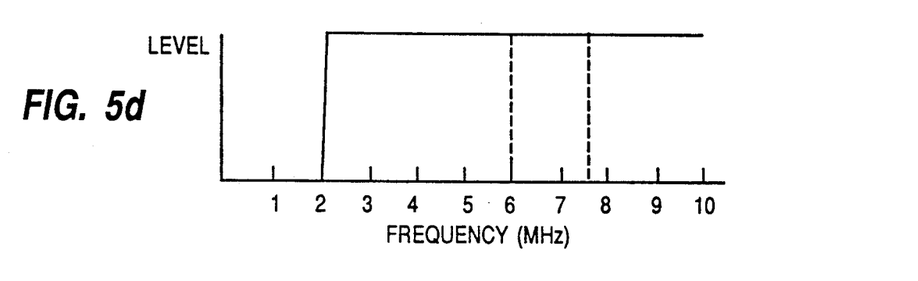

FIG. 3 is a block diagram showing a signal processing system of a recording apparatus of this invention. FIGS. 4(a)-4(f) show the synchronizing signals used, in the recording apparatus of this invention.

FIG. 4 (a) shows a horizontal synchronizing signal of an NTSC signal, FIG. 4 (b) shows an expansion of one horizontal synchronizing signal interval, FIG. 4 (c) shows a new synchronizing signal of this invention having a period of about 45 μs, FIG. 4 (d) shows a luminance signal after compression, FIG. 4 (e) shows a new synchronizing signal having a pulse width thinner than the pulse width of the synchronizing signal shown in FIG. 4 (c), obtained by dividing the period of the synchronizing signal shown in FIG. 4 (c) into three equal parts, and FIG. 4 (f) shows a color difference signal after compression.

The case where an NTSC signal is used as an input video signal will be explained below as an example.

Referring to FIG. 3, a composite video signal sent from a VTR, a video camera or the like is inputted to a video signal input terminal 31. In case that component signals which are a luminance signal Y and chrominance signal C already separated with each other (Y/C separated) are supplied, the luminance signal and chrominance signal are inputted to a Y-signal input terminal 33 and C-signal input terminal 34, respectively. The video signal is inputted to a video signal separation circuit 30. The composite video signal is separated into a luminance signal and a chrominance signal in a Y/C separation circuit 32 of the video signal separation circuit 30. By a switching signal from an input terminal 37 for switching the video signal input, a selector 35 selects either the luminance signal separated in the Y/C separation circuit 32, or the luminance signal from the Y-signal input terminal 33. In addition, by using the same switching signal, a selector 36 selects either the chrominance signal separated in the Y/C separation circuit 32, or the chrominance signal from the C-signal input terminal 34. In a band compression circuit 38, the luminance signal from the selector 35 is delivered to a low-pass filter 39 and a band-pass filter 40. The low-pass filter 39 attenuates a signal having a frequency higher than 4.2 MHz to thereby take out a low-band component having a frequency not exceeding 4.2 MHz. The band-pass filter 40 takes out a high-band component having a frequency ranging from 4.2 to 6.3 MHz. The high-band component signal thus taken out is subjected to balanced modulation in a balanced modulation circuit 41 using a carrier of about 8.4 MHz, half odd-number times the horizontal synchronizing frequency. A band-pass filter 42 takes out a lower side band having a frequency of 2.1 to 4.2 MHz from the signal thus balanced-modulated. The lower side band thus taken out and the above-mentioned low-band component signal with a frequency not exceeding 4.2 MHz are added to each other in an adder 43. As a result, the line spectrums of the highband component of the luminance signal are interleaved between the line spectrums of the low band component thereof to thereby be band-compressed. Since the luminance signal of an NTSC signal generally has a frequency not exceeding 4.2 MHz, the band compression circuit 38 is possible to be omitted.

On the other hand, the chrominance signal from the selector 36 is converted into color difference signals (R-Y) and (B-Y) through a well-known line sequential color difference circuit 44 to be subjected to the line sequential processing. The band-compressed luminance signal from the adder 43 and the color difference signal thus subjected to the line sequential processing are sent to a time-axis compression multiplex circuit 45. In this time-axis compression multiplex circuit 45, the band-compressed luminance signal from the adder 43 and the line sequential color difference signal from the line sequential color difference circuit 44 are respectively sampled and quantized by analog-digital (A/D) converters 46 and 47 to be converted into a digital luminance signal and a digital line sequential color difference signal. The digital luminance signal and the digital line sequential color difference signal are respectively written into time-axis compression memories 48 and 49, compressed at a predetermined compression ratio, and subjected to a time-division multiplex in a multiplexer 50 using a control signal SK1 shown in FIG. 1. The signal thus subjected to the timedivision multiplex is returned to an analog signal through a digital-analog (D/A) converter 51 and modulated in a frequency-modulation circuit 52 using suitable carrier and frequency deviation.

An analog audio signal is inputted to an analog audio signal input terminal 53 and a dubbing audio signal from the outside is inputted to a digital audio signal input terminal 54. Both the analog and digital audio signals are inputted to a digital audio signal conversion circuit 55. In this circuit 55, the analog audio signal is sampled and quantized through an A/D converter 56. A selector 57 selects either the output signal from the A/D converter or the dubbing digital audio signal using a signal from a dubbing ON/OFF switching signal input terminal 58. The signal thus selected is inputted to a digital signal processing circuit 59. In this processing circuit 59, a code error correcting parity is formed, and a data re-arrangement is carried out through means which are well-known in the digital audio tape recorders (DAT recorders). The output signal from the circuit 59 is time-compressed through a time-axis compression circuit 60 and then sent to a digital modulation circuit 62. The time-axis compression circuit 60 is made of a time axis compression memory 61.

In a digital data generation circuit 63, an absolute address signal, a relative address signal, a mode discrimination signal, a control signal and an independent data are generated. In this circuit 63, for example, with an optical disk or the like, if an absolute address signal has been recorded thereon in an irregular pattern (pitpattern) in advance, the above-mentioned absolute address signal is not generated. Further, in this circuit 63, a mode discrimination signal discriminated by the sampling frequency, the number of quantization bits and the number of channels of an audio signal, a control signal showing the number of effective samples to be processed in one frame having the digital audio signal sampled, and the occurrence repetition period of the specific number of effective samples are generated. When a digital audio signal is inputted from the digital audio signal input terminal 54, a mode discrimination signal and a control signal from an external mode discrimination signal and control signal input terminal 64 are outputted directly. The mode discrimination signal and control signal are sent to the digital signal processing circuit 59 and a timing signal generation circuit 71 for controlling the sampling frequency, the number of quantization bits, the number of channels and the number of samples to be processed. In addition, an independent data is inputted through an independent data input terminal 65 into the digital data generation circuit 63. The relative address signal showing the time code accompanied with the input video signal is supplied from a relative address signal input terminal 66.

The time-division multiplexed and frequency-modulated (FM) luminance signal, line sequential color difference signal and the output signal from the digital modulation circuit are multiplexed within one frame period at a suitable compression ratio, and then, in order to generate a clock or a control signal during reproduction, a frame synchronizing signal and a horizontal synchronizing signal which are contained in the luminance signal from the selector 35 are taken out through a synchronizing signal separation circuit 67.

A selector 69 selects either the horizontal synchronizing signal of the output signal from the synchronizing signal separation circuit 67 or a horizontal synchronizing signal from an external synchronizing signal input terminal 68 using a signal from an external/internal switching signal input terminal 70. The signal thus selected is inputted to a timing signal generation circuit 71. A master clock generation circuit 72 in the circuit 71 generates a video signal master clock phase-synchronized with the horizontal synchronizing signal from the selector 69.

In a dividing circuit 73, a sampling clock CK1 for the A/D converter 46, a sampling clock CK2 for the A/D converter 47, an address clock MK1 for the time-axis compression memory 48, an address clock MK2 for the time-axis compression memory 49, the control signal SK1 shown in FIG. 1 for the multiplexer 50, a clock CK6 for the D/A converter 51 and control signals SK2 and SK3 shown in FIG. 1 for a multiplexer 74 described later are generated. In addition, a data clock phase-synchronized with the data of a digital audio signal from an external audio signal clock terminal 75, or an audio signal clock generated from an audio signal master clock generation circuit 76 is selected, in a selector 77 by the dubbing ON/OFF switching signal to thereby be sent to a dividing circuit 78. In the dividing circuit 78, a sampling clock CK3 for the A/D converter 75 in order to sample the analog audio signal, a clock CK4 for the digital signal processing circuit 59, an address clock MK3 for the time-axis compression memory 61, a clock CK7 for the digital modulation circuit 62 and a clock CK5 for the digital data generation circuit 63 are generated.

The frame synchronizing signal from the synchronizing signal separation circuit 67 and an external frame synchronizing signal from an external synchronizing signal input terminal 68 are selected in a selector 80 using a switching signal from an external/internal switching signal input terminal 70 and sent to a synchronizing signal generation circuit 79. Also, the clock signal from the video master clock generation circuit 72 is inputted to this circuit 79. From these video master clock signals and frame synchronizing signals, to obtain synchronizing signals different from the input video synchronizing signals (a) and (b) as shown in FIG. 4, the frame period is newly divided into 735 equal parts, and a synchronizing signal (c) which is smaller in pulse width than that of the horizontal synchronizing signal is generated in each period thus equally divided. In the line sequential color difference signal recording area, the period thus equally divided is further divided into three equal parts to thereby generate a synchronizing signal (e) which is smaller in pulse width than that of the synchronizing signal (c).

In a multiplexer 74, the output signal from the frequency-modulation circuit 52, the output signal from the digital modulation circuit 62, the output signal from the digital data generation circuit 63 and the output signal from the synchronizing signal generation circuit 79 are subjected to a time-division multiplex with the signals SK2 and SK3 shown in FIG. 1. The output signal from the multiplexer 74 is recorded on a recording medium 82 through, for example, an optical head 81. A phase synchronization circuit 83 is for phase-synchronizing a rotational synchronizing signal to be reproduced from the recording medium 82 with a frame synchronizing signal from the selector 80 and controls a driver 84.

FIGS. 5(a)-5(d) show frequency allocations of a video signal to be used in this invention. FIG. 5 (a) shows a base band of the luminance signal, FIG. 5 (b) shows the frequency allocation of the frequency-modulation of the luminance signal, FIG. 5 (c) shows a base band of the color difference signal and FIG. 5 (d) shows the frequency allocation of the frequency-modulation of the color difference signal.

In this embodiment of this invention, when the base band is more than 6.3 MHz, the luminance signal of an input video signal is band-compressed to below 4.2 MHz as shown in FIG. 5 (a). Then, it becomes 5.04 MHz through the time-axis compression and is frequency-modulated using a suitable frequency deviation and carrier. The color difference signals (R-Y) and (B-Y), as shown in FIGS. 5 (c) and (d), are subjected to the line sequential processing with a base band of 1.4 MHz. This line sequential color difference signal is subjected to the time-axis compression to form a frequency band of 5.04 MHz and then frequency-modulated using a suitable frequency deviation and carrier. Thus, the lower side band's of the frequency-modulated waves of the band-compressed luminance signal and line sequential color difference signal come to have a band of about 7 to 8 MHz.

In this embodiment of this invention, the horizontal synchronizing period of an input video signal is about 63.5 μs, the horizontal synchronizing frequency thereof is 15.734 kHz and the effective video area within one horizontal period is about 53 μs. Thus, the number of effective lines within one frame is 484, the sampling frequency of the luminance signal is 13.5 MHz, the number of effective samples thereof is 704, the sampling frequency of the color difference signal is 13.5/3 MHz and the number of effective samples thereof is 235.

With the construction as shown in FIG. 3, the write clock for the luminance signal to the time-axis compression memory is 13.5 MHz, and the read clock is about 16 MHz. The write clock for the color difference signal to the time-axis compression memory is 4.5 MHz and the read clock is the same as that for the luminance signal. In this case, compression ratios of the luminance and color difference signals are 1.2 and 3.6, respectively.

Even if a video signal system other than the NTSC is used, the processing of the band compression circuit 38 or the line sequential color difference circuit 44 is almost the same except that frequencies are different. Other processings are the same.

Next, the sampling of an audio signal and construction of a digital signal will be explained below.

For sampling audio signals, two methods can be considered; a method in which the synchronization is made with a frequency integer times the frame frequency of a video signal to sample and another method in which the sampling is made asynchronously with a frequency completely not in an integer ratio relationship thereto. DATs and broadcastings via satellite have adopted 48 kHz and 32 kHz for their sampling frequencies, respectively, which are based on the latter method. Therefore, the digital dubbing of NTSC signals to the system to be processed them in a frame unit is impossible.

It will be explained below that the latter method is capable of responding to the signal processing in a frame unit in this invention.

If the sampling frequency is 48 kHz, the number of samples per channel of one frame is about 1601.6. Thus, for example, if the sample number of an odd-numbered frame is 1602 and that of an even-numbered frame is 1601, the accumulated number samples of the original sample (1) (1601.6×5=8008) and that of samples allocated to each frame according to this invention (2) (1602+1601+1602+1601+1602=8008) become equal to each other at the fifth frame as shown below, resulting in no excess or deficiency in the number of samples. Therefore, if five frames are repeated as a unit, even when the sampling frequency is not in an integer ratio relationship to the frame frequency, the signal processing becomes possible.

| Frame No. | No. of samples | Accumulated No. of samples (1) | Accumulated No. of samples (2) | Accumulated No. of samples (1)–(2) |
|---|---|---|---|---|
| 1 | 1602 | 1601.6 | 1602 | +0.4 |
| 2 | 1601 | 3203.2 | 3203 | −0.2 |
| 3 | 1602 | 4804.8 | 4805 | +0.2 |
| 4 | 1601 | 6406.4 | 6406 | −0.4 |
| 5 | 1602 | 8008 | 8008 | ±0 |
| 6 | 1602 | 9609.6 | 9610 | +0.4 |
| 7 | 1601 | 11211.2 | 11211 | −0.2 |
| 8 | 1602 | 12812.8 | 12813 | +0.2 |
| 9 | 1601 | 14414.4 | 14414 | −0.4 |
| 10 | 1602 | 16016 | 16016 | ±0 |
| 11 | 1602 | 17617.6 | 17618 | +0.4 |
| . | . | . | . | . |
| . | . | . | . | . |
| . | . | . | . | . |

Here, in the case where the sampling frequency is 48 kHz, if the average number of samples per channel of one frame is expressed by Z, frames having X samples and Y samples are assumed, the number of frames where the difference between the accumulated number of original samples and the accumulated number of samples obtained when the frames having X and Y samples suitably occur becomes zero is expressed by m, and the number of occurrences of the frames having X and Y samples before the difference in the accumulated number of samples becomes zero are expressed by a and b, respectively, the following are required to be satisfied:

$$Z \cdot m = X \cdot a + Y \cdot b \quad a + b = m \quad X < Z < Y$$

where, X, Y, a, b and m are positive integers.

Furthermore, the frames having X and Y samples are repeatedly appeared with the number of frames expressed by m as a unit.

If the above-mentioned case is applied as an example, X=1601, Y=1602, Z=1601.6, a=2, b=3 and m=5 are obtained. Other examples for a set of (X, Y, m, a, b) are obtained as follows;

```
(1604, 1601,  5,  4,  1), (1603, 1600,  5,  1,  4)
(1604, 1600,  5,  3,  2), (1604, 1598,  5,  2,  3)
(1602, 1598, 10,  1,  9), (1603, 1601, 13,  7,  6)
(1603, 1600, 15,  7,  8), (1602, 1599, 15,  2, 13)
(1605, 1601, 20, 17,  3), (1603, 1599, 15,  7, 13)
(1605, 1600, 25, 17,  8), (1604, 1599, 25, 12, 12)
(1603, 1598, 25,  7, 18), (1605, 1599, 30, 17, 13)
(1605, 1598, 35, 17, 18)
```

If the sampling frequency is 32 kHz, for example, (X, Y, a, b, m) = (1068, 1067, 15, 4, 11) will be obtained.

In the apparatus of this invention, in order to control the number of samples in each frame, a first control code showing the number of samples of each frame and a second control code showing the repetition of the first control code are written in advance in the control signal of each frame. Therefore, in the case where one frame is allocated for one rotation of an optical disk, for example, if (X, Y, a, b, m) = (1602, 1601, 5, 2, 3), the allocation of the following control codes to each frame makes it possible to know the number of samples of any frame. For example, the following are obtained:

| 2nd control code | 1st control code | No. of samples |
|---|---|---|
| 0101 | 000 | 1602 |
|  | 001 | 1601 |
|  | 010 | 1602 |
|  | 011 | 1601 |
|  | 100 | 1602 |

The signal format of an audio signal of this invention will be explained below.

In the apparatus of this invention, the sampling frequency is 48 kHz, the number of quantization bits is 16, the number of channels is 2 and the error correcting code is a product code consisting of a read solomon code having the minimum distance of 5.

Figure 6:
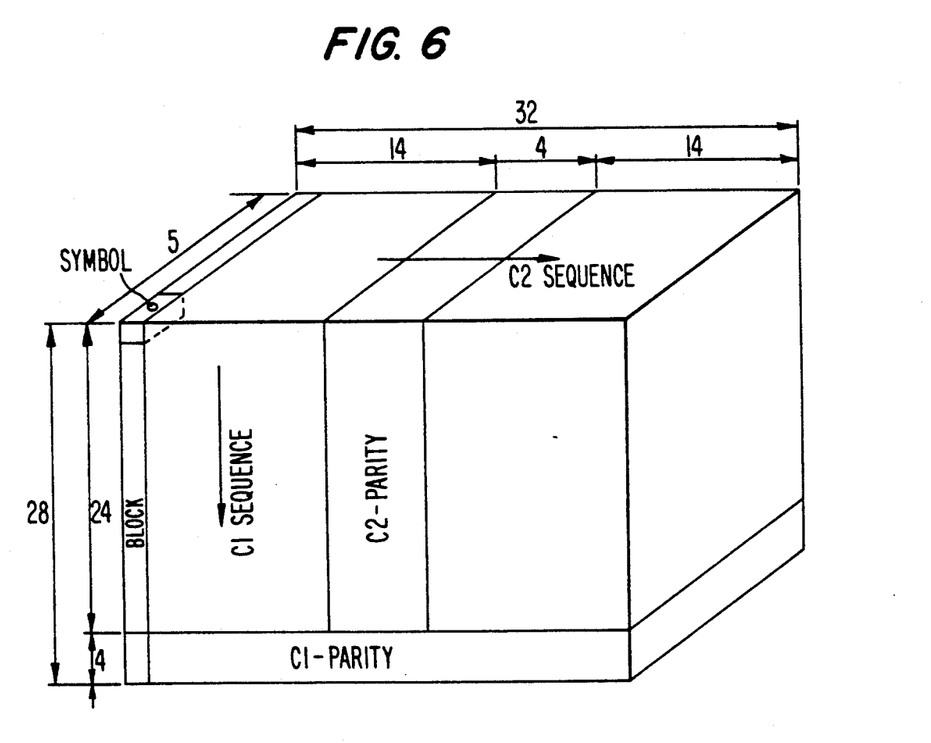
FIG. 6 shows an example of signal configurations of digitized audio signals used in a recording apparatus of this invention.

Since the audio signal is sampled at 48 kHz, the number of samples per channel per frame becomes 1601.6. As the number of samples to be processed in one frame must be an integer, such frames that have 1601 and 1602 as the number of samples will be formed. As a result, with the 2-channel system, 3202 and 3204 will be obtained as the number of samples and 6404 and 6408 will be obtained as the number of symbols. In the embodiment of this invention, the number of symbols is divided into two for executing the code processing, which is exemplified in FIG. 6. The C1 sequence, which is one of coding sequences, is structured in the vertical direction including a parity of four symbols. On the other hand, the C2 sequence, which is one of different coding sequences therefrom, is structured in the horizontal direction including a parity of four symbols. The width direction indicates the number of planes formed by the C1 and C2 sequences. In FIG. 6, each numeral indicates the number of symbols, where the symbol indicates either of upper eight bits or lower eight bits of samples when divided into as such. In FIG. 6, the number of symbols excepting the parities for the C1 and C2 sequences becomes 24×28×5=3360. Of which, the audio data share about 3200, and zero data are written to the remainder. However, the mode discrimination signal for discriminating the sampling frequency, the number of quantization bits, etc. of an audio signal to be used or the number of samples of each frame can be written thereinto. There exist two sets signal structures in one frame as shown in FIG. 6. With this structure, the correspondence to the 525/60, 625/50 system advantageously becomes possible only by changing the depth in FIG. 6 from 5 to 6 without changing in the code length of each of the C1 and C2 sequences. This is because of such a relation as 48000÷60 : 48000÷50=5 : 6.

The audio signal, may have the sampling frequency of 48 kHz, the number of quantized bits of 16 and the number of channels of 2, or it may have the sampling frequency of 32 kHz, the number of quantized bit of 12 and the number of channels of 2 and 4, for example. In the case where the sampling frequency is 32 kHz and the number of quantization bits is 12, supposing that the sampling frequency is 24 kHz and the number of quantization bits is 16, the number of data only becomes half that in case of being the sampling frequency at 48 kHz, so that the processing can be made in the same way as in the case of using 48 kHz. In addition, the number of data becomes half, so that the four-channel system will become possible. With such a structure, for example when one frame has 735 divisions, if 80 divisions are allocated to the digital audio signal area shown in FIG. 1 and a NRZI recording circuit of well-known duobinary code or 2/7 runlength-limited (RLL) code is introduced into the digital modulation circuit 62, the transmission rate of about 2 Mbps of the output signal from the digital signal processing circuit 59 is subjected to the time-axis compression to form a transmission rate of about 22 to 23 Mbps. Thus, the maximum recording frequency results in ranging from 7 to 8 MHz. As described above, in the embodiment of this invention, maximum recording frequencies of the luminance signal, color difference signal and audio signal are nearly equal to each other.

In addition, the recording apparatus of this invention makes possible the recording of an audio signal in all areas. Further, it makes possible the recording of characters or diagrams in all areas as well as the application as an OA (Office Automation) file.

Also, in order to make possible the independent recording and erasing of the video or audio signal using a re-writable recording medium, a guard band may be provided between the digital audio signal and line sequential color difference signal.

What is claimed is:

1. An audio and video recording apparatus comprising:
   band compression means for band-compressing a luminance signal of an input video signal thereby to obtain a band-compressed luminance signal;
   means for executing a line sequential color difference processing on a chrominance signal of the input video signal thereby to obtain a line sequential color difference signal;

first multiplex means for executing a time-axis compression multiplex on each of the band-compressed luminance signal and the line sequential color difference signal in every frame;

frequency modulation means for frequency-modulating an output signal of the first multiplex means;

digital audio signal conversion means for converting an input audio signal into a digital audio signal;

means for executing a time-axis compression on an output signal from the digital audio signal conversion means in every frame thereby to obtain a time-axis compressed audio signal;

digital modulation means for modulating digitally the time-axis compressed audio signal;

digital data generation means for generating digital data;

synchronizing signal generation means for producing a predetermined synchronizing signal from an input video signal;

second multiplex means for multiplexing output signals from the frequency modulation means, the digital modulation means, the digital data generation means and the synchronizing signal generation means; and recording means for recording an output signal from the second multiplex means on a recording medium.

2. An audio and video recording apparatus as claimed in claim 1, wherein the first multiplex means comprises:

first analog-digital conversion means for sampling and quantizing the band-compressed luminance signal;

second analog-digital conversion means for sampling and quantizing the line sequential color difference signal;

first memory means for storing an output signal from the first analog-digital conversion means for one frame thereby to execute a time-axis compression thereon;

second memory means for storing an output signal from the second analog-digital conversion means for one frame thereby to execute a time-axis compression thereon;

multiplex means for multiplexing output signals from the first memory means and the second memory means with each other; and digital-analog conversion means for converting an output signal from the multiplex means into an analog signal.

3. An audio and video recording apparatus as claimed in claim 1, wherein the digital data generation means comprises:

means for generating an absolute address signal showing a track number or a frame number which is inherent in the recording medium and continuous in an effective recording area;

means for generating a relative address signal showing a time code having a frame accompanied with the input video signal as a minimum unit;

means for generating a mode discrimination signal showing a sampling frequency, a number of quantization bits and a number of channels of the input audio signal;

means for generating a first control code showing a number of effective samples of the digital audio signal within one frame and a second control code showing a repetition period of the first control code; and means for generating independent data that users are usable freely.

4. An audio and video recording apparatus as claimed in claim 1, wherein the digital audio signal conversion means comprises:

analog-digital conversion means for sampling and quantizing the input audio signal; and digital signal processing means for executing a predetermined digital signal processing on an output signal from the analog-digital conversion means.

5. An audio and video recording apparatus as claimed in claim 4, wherein the digital signal processing means includes:

means for re-arranging the audio data after the analog-digital conversion;

encoding means for forming a parity for error code correction use; and control means for controlling the number of effective analog-digital conversion samples for one frame.

6. An audio and video recording apparatus as claimed in claim 4, wherein the digital signal processing means comprises:

means for re-arranging the audio data after the analog-digital conversion;

encoding means for generating a parity for code error correction use;

means for controlling the number of effective analog-digital conversion samples for one frame;

means for generating a first control code showing the number of effective analog-digital samples for one frame;

means for generating a second control code showing a repetition period of the first control code; and means for generating a mode discrimination signal showing a sampling frequency, the number of quantization bits and the number of channels of the audio signal.

7. An audio and video recording apparatus as claimed in claim 1, further comprising:

frame synchronizing signal separation means for separating a frame synchronizing signal from the input video signal;

reading means for reading a frame synchronizing signal recorded on the recording medium; and phase-synchronization means for phase-synchronizing the frame synchronizing signal outputted from the frame synchronizing signal separation means with the frame synchronizing signal outputted from the reading means.

8. An audio and video recording apparatus as claimed in claim 1, wherein the synchronizing signal generation means includes:

a master clock generation means for generating a video master clock signal synchronized with the synchronizing signal of the input video signal; and a dividing means for dividing the video master clock signal to produce a first predetermined synchronizing signal which is smaller in both pulse width and occurring interval than the synchronizing signal of the input video signal and a second predetermined synchronizing signal which is smaller in both pulse width and occurring interval than the first predetermined synchronizing signal, the first and second predetermined synchronizing signals being used as synchronizing signals of the time-axis compressed luminance signal and line sequential color difference signal, respectively.

9. An audio and video recording apparatus comprising:
- band compression means for compressing a frequency band of a luminance signal of an input video signal to obtain a band-compressed luminance signal, said band compression means comprising (a) separation means for separating the luminance signal into a low-band component and a high-band component, (b) balanced modulation means for balanced-modulating the high-band component of the luminance signal using a signal having a frequency half odd-number times the horizontal synchronizing frequency to thereby obtain a balanced-modulated wave, (c) extraction means for extracting a lower side of the balanced-modulated wave, and (d) adder means for adding the low-band component of the luminance signal and the lower side band of the balanced-modulated wave to thereby obtain the band-compressed luminance signal;
- means for executing a line sequential color difference processing on a chrominance signal of the input video signal to obtain a line sequential color difference signal;
- first multiplex means for executing a time-axis compression multiplex on each of the band-compressed luminance signal and the line sequential color difference signal in every frame;
- frequency modulation means for frequency-modulating an output signal of the first multiplex means;
- digital audio signal conversion means for converting an input audio signal into a digital audio signal;
- means for executing a time-axis compression on the digital audio signal in every frame to obtain a time-axis compressed audio signal;
- digital modulation means for modulating digitally the time-axis compressed audio signal;
- digital data generation means for generating digital data;
- synchronizing signal generation means for producing a predetermined synchronizing signal from the input video signal;
- second multiplex means for multiplexing output signals from the frequency modulation means, the digital modulation means, the digital data generation means and the synchronizing signal generation means; and
- recording means for recording an output signal from the second multiplex means on a recording medium.

* * * * *